T. A. REEDER.
LOCK FOR AUTOMOBILES.
APPLICATION FILED JULY 17, 1919.

1,325,307.

Patented Dec. 16, 1919.

Inventor
T. A. Reeder,

By Mason Fenwick & Lawrence,
Attorneys

UNITED STATES PATENT OFFICE.

THOMAS A. REEDER, OF BALTIMORE, MARYLAND.

LOCK FOR AUTOMOBILES.

1,325,367.

Specification of Letters Patent.     Patented Dec. 16, 1919.

Application filed July 17, 1919. Serial No. 311,644.

*To all whom it may concern:*

Be it known that I, THOMAS A. REEDER, a citizen of the United States, residing at Baltimore, in the State of Maryland, have invented certain new and useful Improvements in Locks for Automobiles; and I do hereby declare the following to be a full, clear, and exact description of the invention, such as will enable others skilled in the art to which it appertains to make and use the same.

This invention relates to wheel locks and while particularly adapted to automobile wheel locks, is not limited thereto.

An object of this invention is to provide a chock to be locked to automobile wheels to prevent theft and which is locked to the wheel in such a manner as can not be manually turned around and is also locked in such a manner that the pressure upon the automobile wheel transferred to the chock can not cause the chock to turn around. A common trouble with the chocks that are used on the automobiles for locking them against stealing is that they are easily turned around and especially so when the tire is flat and also that the automobile itself turns them around when it is started and they are thereby rendered useless.

Efforts have been made to overcome this difficulty by locking them to the wheel spoke but this places undue stress upon the spoke and also upon the locking means and it is an object of this invention to overcome these stresses upon the spoke and construct the chock in such a formation that it will in itself take care of all these stresses.

A further object of this invention is to provide a chock of simple structure and one easily and cheaply manufactured and light and of neat appearance and one easily manipulated when locking to a car.

With these and other objects in view the invention consists in the construction, combination, and in detail and arrangement of parts as hereinafter more fully described and claimed.

Figure 1:
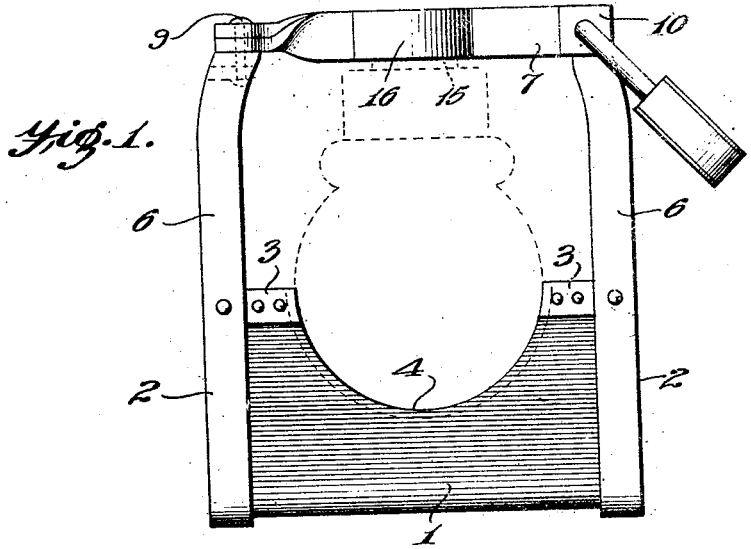
Figure 1 is a cross sectional view of an automobile tire with the chock attached.
Figure 2:
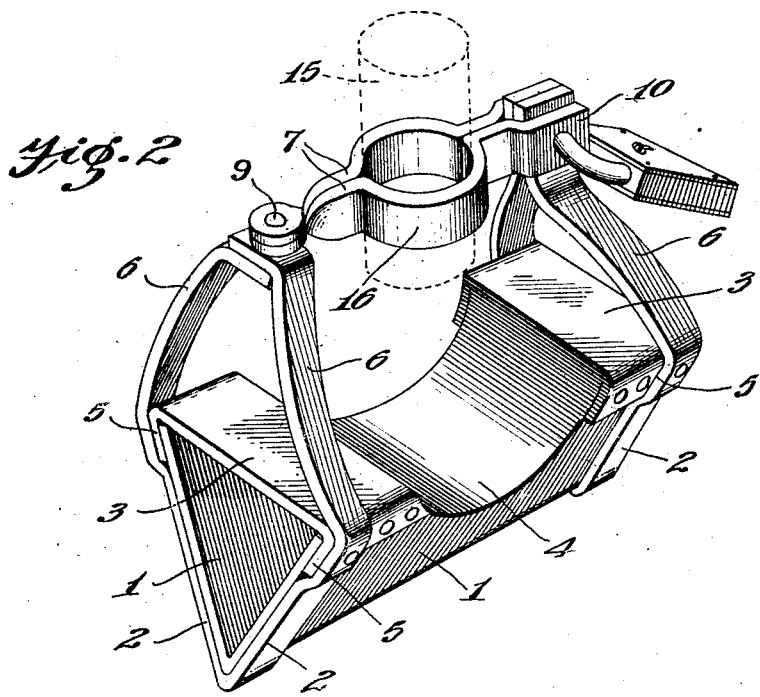
Fig. 2 is a perspective view showing the chock and a fragment of an automobile spoke.

The chock comprises a V-shaped piece of sheet metal 1. At each end of this V-shaped piece of sheet metal are straps 2 extending around said V-shaped piece of metal. This V-shaped piece of metal is joined by braces 3 at each end and has rabbets 4—4 of the same circular formation as the tire to which it is desired to attach the same. The braces 3 are lapped under the strap 2 and over the V-shaped piece 1 as shown at 5 and the three pieces are riveted together. The straps 2 are extended in extension 6 and carry pivoted members 7. Pivoted members 7 are formed of two straps and pivoted to extensions 6 at 9. One of the extensions 6 carries this pivoted member as shown at 9, while the other extension has an eye adapted to receive a padlock. The ends of the straps 6 are secured by rivets not shown. One of said straps is perforated at the overlapping ends to carry pivoted members 7 and the other of said straps is perforated to coreceive a lock with said pivoted members. This pivoted member 7 is of circular formation at 16 and adapted to open in order to allow it to be inserted around a spoke 15.

The length of the V-shaped member forming the chock proper is slightly greater than the diameter of the tire. When it comes in engagement with the road as the automobile wheel is being turned in case of theft, for instance, the whole face for the width of a surface greater than the diameter of the tire comes in contact with the ground and as a result of this it braces itself against turning.

The angularity and thickness of the V-shaped sheet 1 is such as to properly take the weight of an automobile and to prevent the cutting of the automobile tire and so not to strain this sheet against the support of brace 3.

With the structure of chock 1 to resist the turning movement under the pressure of the wheel, strap 6 of the pivoted member 7 need be only of sufficient strength to prevent the theft of the lock, whereas formerly all turning stress from angular pressure on the wheel was transferred to the wheel and yoke straps.

What I claim is:

1. A wheel chock comprising a sheet bent in V-shape and rabbeted to mate a tire and means for affixing said chock to a tire, the said affixing means comprising straps around the ends of said chock, said straps affixed to said chock, one of said straps carrying a pivoted member, and the other of said straps adapted to receive and lock said pivoted member.

2. A wheel chock comprising an angle bar bent from sheet metal and means for affixing said bar transversely to a wheel with the apex of said bar toward the ground.

3. A wheel chock comprising an ordinary angle iron of length greater than the diameter of a tire to which affixed and means for fixing said angle iron transversely to a wheel with the apex of said iron toward the ground.

In testimony whereof I affix my signature.

THOMAS A. REEDER.